Nov. 12, 1946.　　　　F. W. AVILA　　　　2,410,921
POWER TRANSMISSION DEVICE
Filed Jan. 19, 1945　　　4 Sheets-Sheet 1

Inventor:
Frank W. Avila.
By Paul O. Pippel
Atty.

Nov. 12, 1946.   F. W. AVILA   2,410,921

POWER TRANSMISSION DEVICE

Filed Jan. 19, 1945   4 Sheets-Sheet 3

Inventor:
Frank W. Avila.
By Paul O. Pippel
Atty.

Inventor:
Frank W. Avila
By Paul O. Pippel
Atty.

Patented Nov. 12, 1946

2,410,921

UNITED STATES PATENT OFFICE 2,410,921

POWER TRANSMISSION DEVICE

Frank W. Avila, Columbia City, Ind., assignor to International Harvester Company, a corporation of New Jersey Application January 19, 1945, Serial No. 573,550

10 Claims. (Cl. 74—260)

1

This invention relates to a power transmission device. More specifically it relates to a variable speed transmission.

Most automotive vehicles have used change-speed transmissions of the sliding gear type. Recently, considerable development work has been done with automatic or semi-automatic transmissions which shift from one speed to another upon attaining certain speed or load conditions. Fluid drive couplings have also been used to some extent, said couplings giving a resiliency in the drive mechanism which makes possible the use of change-speed devices of a positive nature, the fluid drive coupling taking up the shock allowed by slippage.

The principal object of the present invention is to provide an improved transmission incorporating a plurality of clutch and brake devices.

A more specific object is to provide a transmission in which speeds may be selected by the use of clutch and brake devices.

Another subsidiary object is the use of expanding coil spring clutches and brakes in a transmission device.

Another principal object is to utilize a planetary type of transmission with metallic spring clutch and brake devices.

Another subsidiary object is to utilize clutch and brake devices engageable in one relative direction of two cooperating members between which the clutch is placed and overrunning in the other relative direction of rotation of the cooperative members.

Another object is to provide an automatic change-speed device utilizing spring type clutches and brakes operable by applying pressure to a free end of a coil spring clutch element.

The above objects and others which will be apparent from the detail description to follow are attained by a construction as shown in the drawings, in which.

Figure 3:
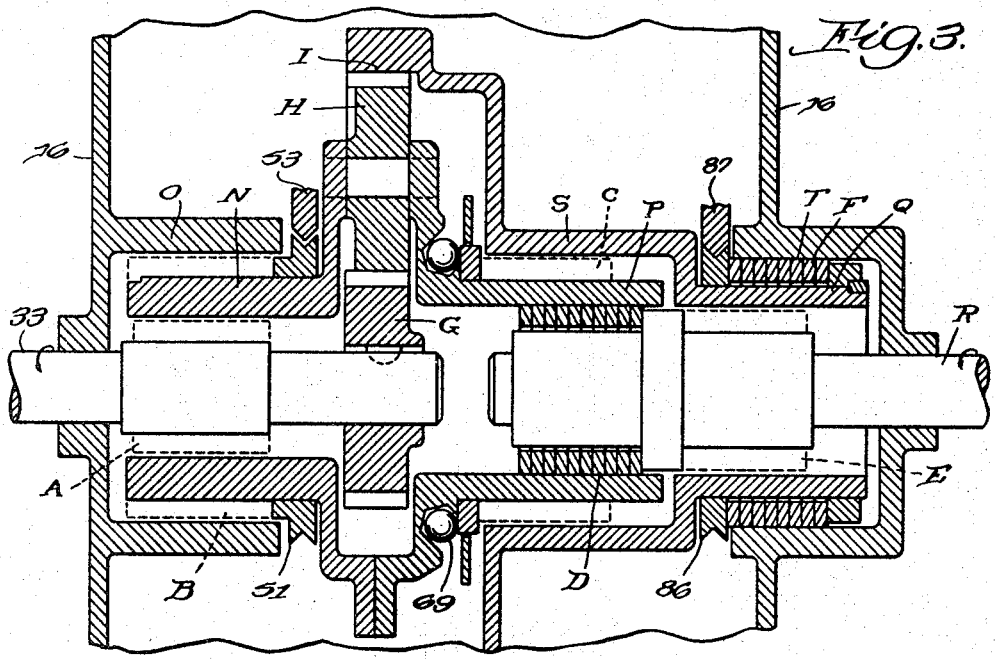
Figure 3 is a simplified showing of the construction of Figure 2 with bearings and other constructional units omitted so that the operation of the functional parts can be better described and understood.
Figure 4:
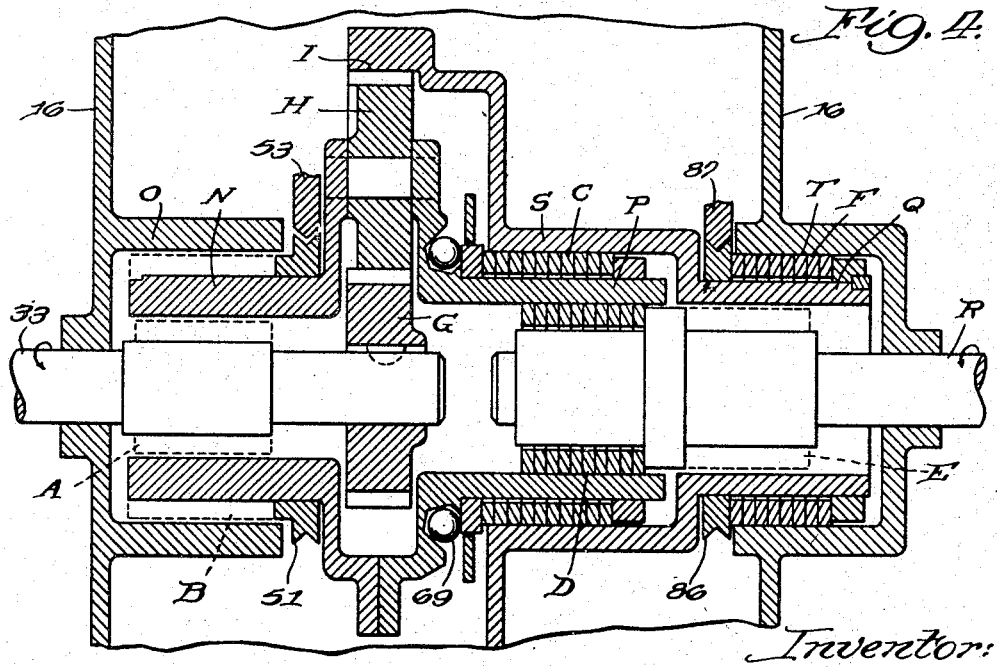
Figure 5:
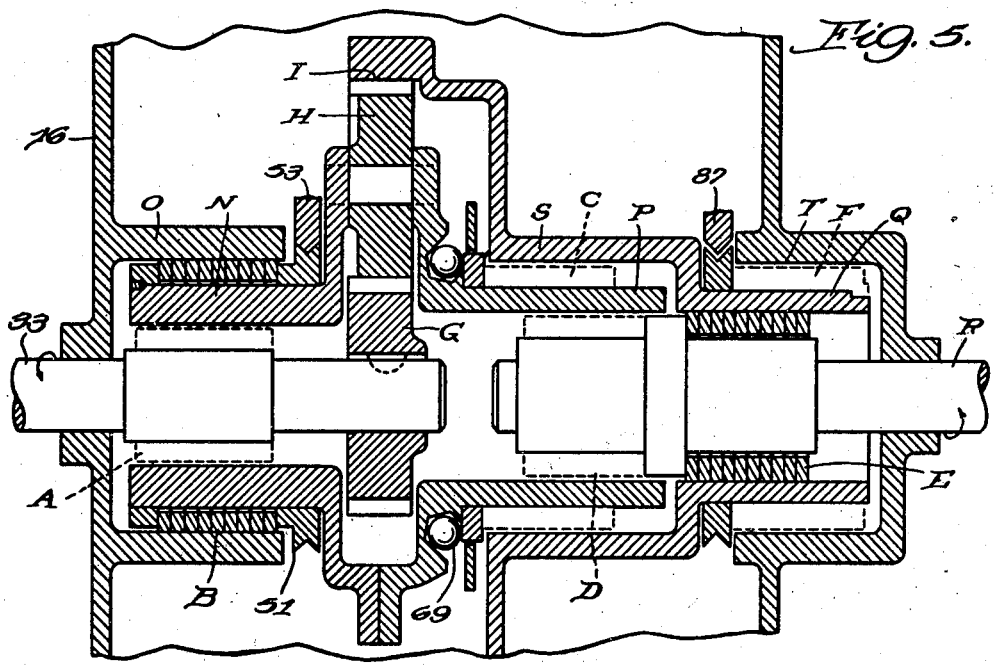
Figure 6:
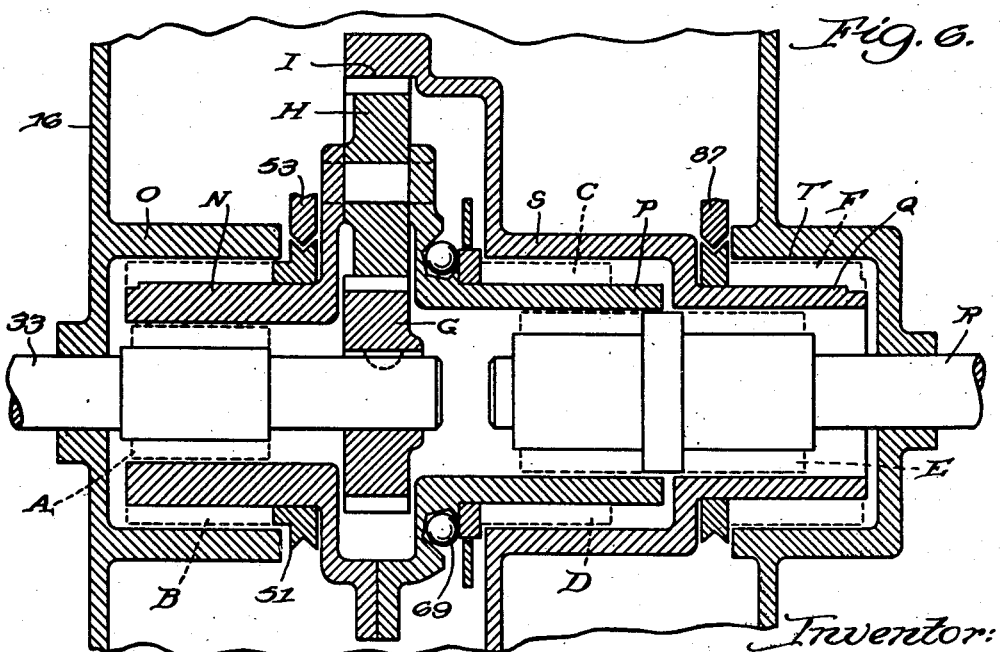

Figures 4, 5, and 6 are similar to Figure 3, each of these four figures showing a different speed condition of the gearing and other mechanism of the transmission device.

Figure 1:
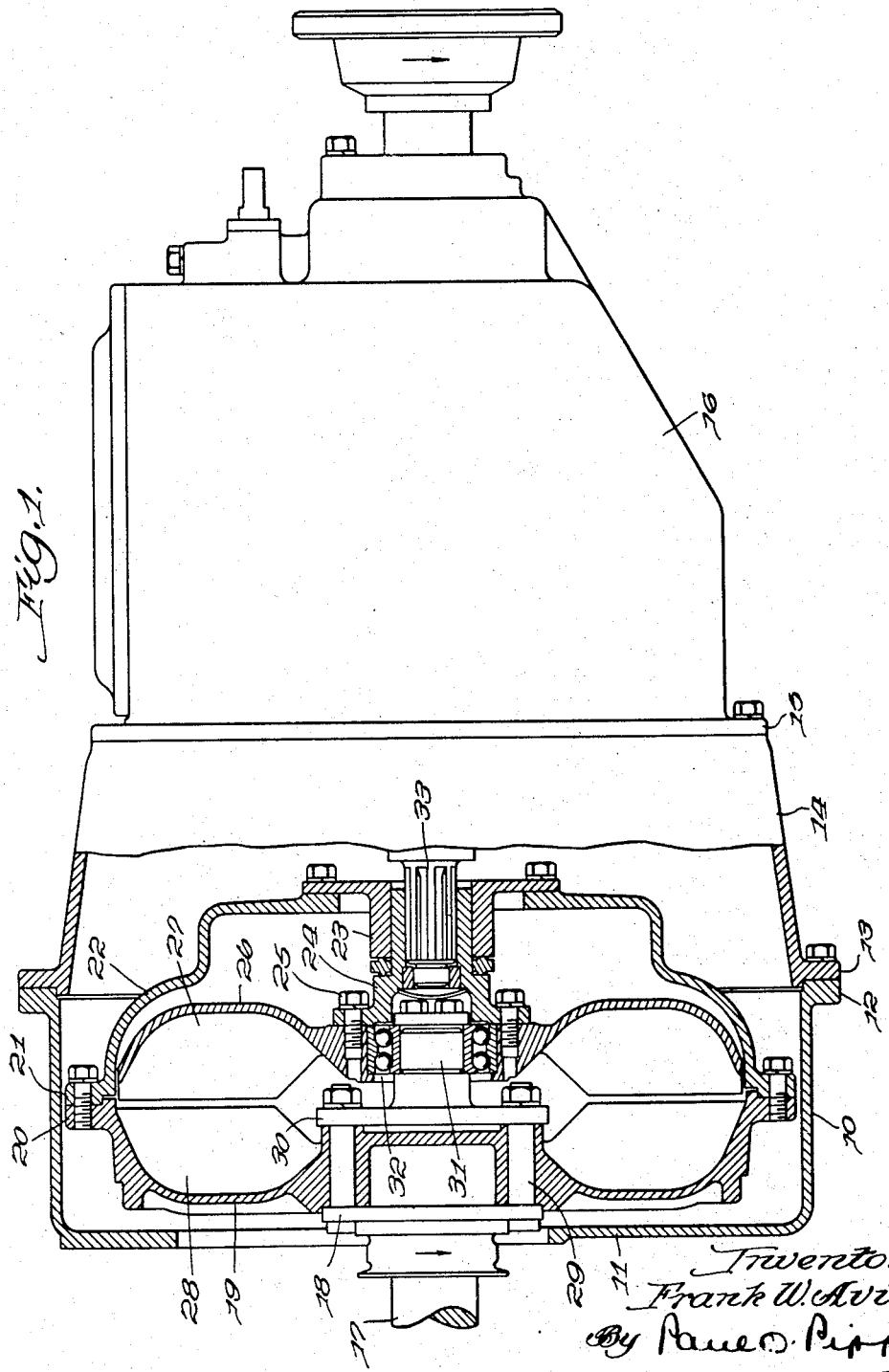
Figure 1 is a side elevation of a transmission device particularly adapted for automotive vehicles, with a portion broken away in a vertical section to show a fluid coupling device.

Referring to Figure 1, the casing structure, which in an automotive vehicle would be rigidly secured to the engine structure extending rearwardly therefrom, includes three housing sections. A forward housing section 10 having a front wall 11 is secured by a flange 12 to a flange 13 on a center housing section 14. Said section is secured to a flange 15 of the rear housing section 16 which provides a casing for the change-speed mechanism. The rear end of the crank-shaft 17 is illustrated as projecting into the forward housing section 10. Said crank-shaft is provided with a flange 18 which is secured to a housing 19 which forms part of a fluid drive mechanism. Said housing 19 is connected by a flange 20 to a flange 21 formed on a second housing 22 which cooperates with the housing 19 to provide a reservoir for a fluid drive mechanism. A flanged sleeve 23 secured to the housing 22 supports a flanged sleeve 24 which is secured by cap screws 25 to a member 26 which is the driven portion of the fluid drive coupling. Said member 26 carries a plurality of radial veins 27 which cooperate with radial veins 28 on the housing 19 to form a fluid drive mechanism of a conventional type such as is now in extensive use on automotive vehicles.

The housing 19 is secured to the flange 18 of the flywheel of the crank-shaft 17 by a plurality of bolts 29. Said bolts also secure a flange 30 formed on a stub shaft 31 rigidly to the crankshaft for rotation therewith. By means of a ball-bearing assembly 32 the member 26 and the structure secured thereto including the sleeve 24 are rotatably mounted concentric with the axis of the crank-shaft.

Figure 2:
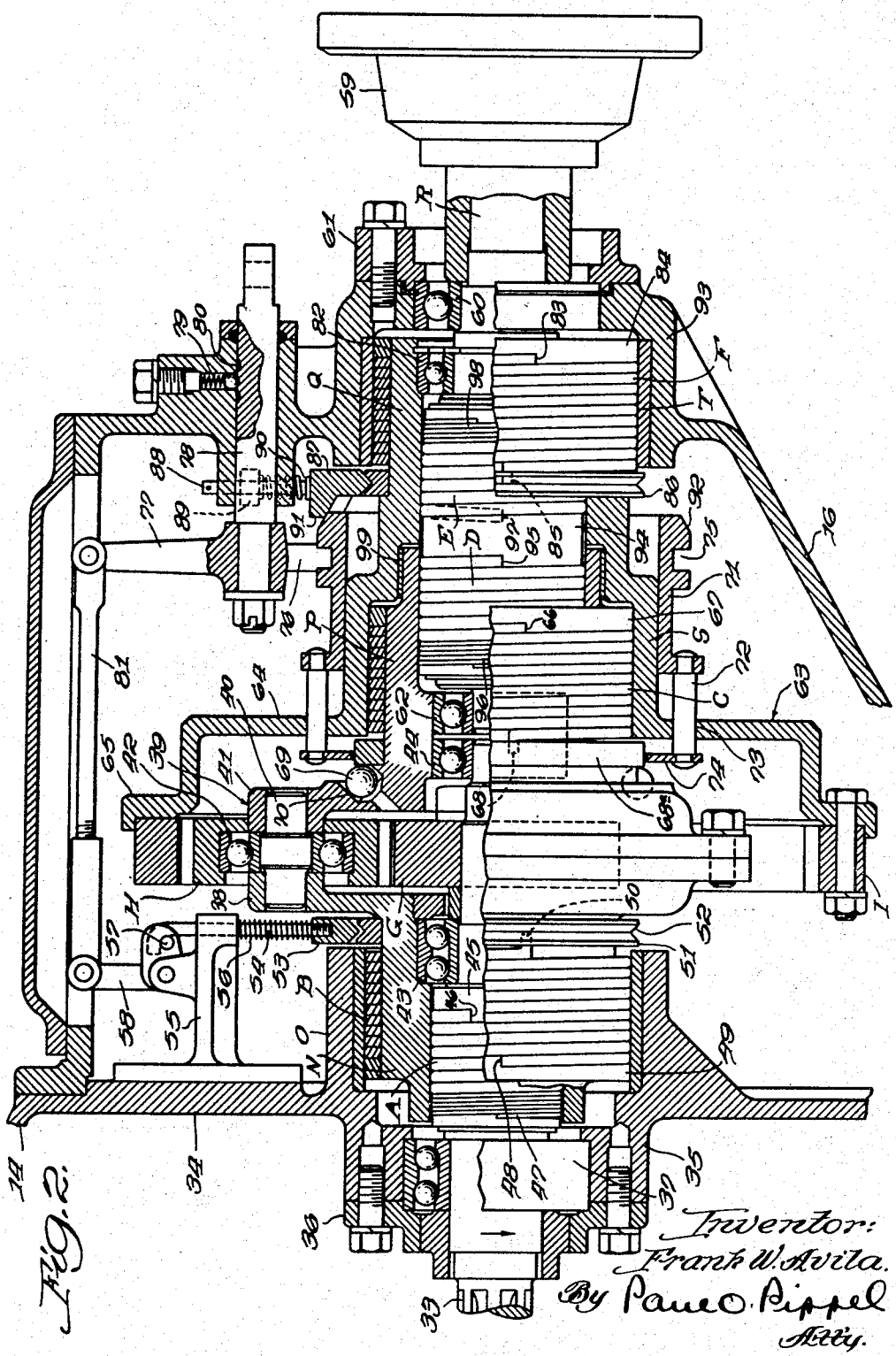
Figure 2 is a vertical longitudinal section through the change-speed portion of the transmission device shown in Figure 1.

The sleeve 24 is splined onto a transmission power input shaft 33 which extends rearwardly from the fluid drive coupling, as shown in Figure 1, to the change-speed portion of the device, as shown in Figure 2.

The rear section or casing 16 of the housing structure cooperates with a vertical wall 34, as shown in Figure 2, to provide a lubricant compartment for the change-speed portion of the transmission. The wall 34 is an integral portion of the center section 14. An outwardly extending flange 35 formed on the wall 34 provides means, in cooperation with a cap 36, to support a ball-bearing assembly 37 in which the shaft 33 is rotatably mounted.

The wall 34, in addition to the flange 35, has an integrally extending flange which is formed as a sleeve O concentric with respect to the shaft 33. The inner cylindrical face of the sleeve O is finished to provide an engaging face for a coiled spring brake B. Said brake is carried by a sleeve N which is an integral extension of one member 38 of a planet carrier designated in its entirety by the reference character 39. Said planet carrier includes a plurality of short shafts 40, one end of each of which is anchored in the member 38, the other end of each being anchored in a similar member 41. Between the members 38 and 41 the shafts 40 carry ball-bearing assemblies 42 each of which rotatably supports a planet gear H. The member 39 has a sleeve P formed integrally therewith extending in a direction opposite to the sleeve end. Said sleeve is finished on both its inner and outer faces to provide for engagement therewith of coil spring clutch and brake devices as will be hereinafter described.

The shaft 33 extends integrally being rotatably mounted in the planet carrier 39 by a ball-bearing assembly 43 in the member 38 and a ball-bearing assembly 44 carried by the member 41. Between said ball-bearing assemblies a drive gear G is supported on the shaft 33, said gear being in meshing engagement with the planet gears H.

The shaft 33 is provided with an enlarged cylindrical portion adjacent the sleeve N which has an abutment 45 formed at one end thereof. Said abutment includes a step 46 against which the last coil of a coil spring clutch A abuts. Said clutch includes a plurality of coils of rectangular cross section having a radial dimension such as to substantially fill the radial space between the enlargement on the shaft 33 and the sleeve N. A coil wire extension 47 on the spring clutch A provides a self-energizer to engage the clutch upon relative angular movement of the shaft 33 with respect to the sleeve N in one direction.

The spring clutch A and brake B, which have already been described, are of the type disclosed in U. S. Patent No. 2,235,266, March 18, 1941. The clutch A is of the self-energizing type, being effective to transmit torque in one direction and to overrun in the other direction. The brake B in its neutral position does not transmit torque in either direction. It is of the type adapted to be energized as will hereinafter be described, for transmitting torque in one direction and to overrun in the other direction.

The brake B is carried by the sleeve N, the end of the last coil abutting a step 48 formed in a collar 49, which is rigidly secured by suitable means to the sleeve. The last coil of the spring brake B at the other end opposite the step 48 is provided with an extension 50 which is secured to or engaged with a pulley-like member 51 rotatably mounted on the sleeve N. Said member is formed with a V groove 52 in its periphery engageable by a brake shoe member 53. The member 53 is carried by a pin 54 slidably extending through a bracket 55 mounted in the wall 34. A compression spring 56 urges the brake shoe 53 downwardly into engagement with the member 51. The upper end of the pin 54 is hooked over a transverse pin 57 carried by a bell crank member 58 rockably mounted on the bracket 55.

At the rear end of the casing 16 a coupling member 59 adapted to be secured to a propeller shaft or other driving mechanism is affixed on the end of an output shaft R. Said shaft is rotatably supported by a ball-bearing assembly 60, said bearing assembly being rigidly secured to the casing 16 by a flanged cap 61. The shaft R extends inwardly, the inner end being supported by a ball-bearing assembly 62 in the sleeve P of the planet carrier 39.

A rotatable drum structure, designated in its entirety by the reference character 63, is mounted in the casing concentric with respect to the output shaft R and the input shaft 33. Said drum structure includes a substantially flat annular wall 64 and a flange 65 extending from the said wall. Said flange carries affixed thereto an internal gear I in mesh with the planets H. The drum structure 63 also includes a sleeve S overlapping the sleeve P and radially spaced therefrom to provide an annular chamber in which a coil spring clutch C is mounted. The end coil of said clutch at one end abuts a step 66 formed on a collar 67 rigidly secured by suitable means to the sleeve P. The other end of the spring clutch is provided with a right-angle extension 68 which is secured to or otherwise engaged by a floating collar 68ᵃ rotatably mounted on the sleeve P. Said collar is engageable by a plurality of balls 69 freely mounted for outward movement in diagonal bores 70 extending into the face of the member 41. The ball 69 may move radially outward at an angle as determined by the bores 70 by the action of centrifugal force. The bores 70 are so positioned with respect to the collar 68 that upon outward movement the balls 69 engage the collar 68, thereby exerting force against the end of the spring clutch 60 and acting to cause the engagement of said clutch.

An actuating member in the form of a sleeve 71 is slidably mounted on the outer surface of the sleeve S. Said member carries a plurality of pins 72 slidable through openings 73 in the wall 64. The pins 72 carry an annular plate 74 engageable with the balls 69 whereby the said balls may be held against outward movement and whereby the clutch-engaging action of said balls is inhibited.

The sleeve 71 is formed with an annular channel 75 in which an actuating element 76 extends. Said element is carried by a member 77 fixed on the inner end of a slidable shaft 78. Said shaft extends through a bore formed in the casing 16 and provides means for operating the controlling mechanism within the casing from the outside thereof. A ball detent mechanism 79 is engageable with any one of a plurality of recesses 80 formed in the shaft 78 to lock the shaft movement.

The member 77 is connected by a link 81 with the bell crank member 58 previously referred to.

The drum structure 63 is formed as an extension of the sleeve S with a sleeve Q of smaller diameter. Said sleeve is supported by a ball-bearing assembly 82 on the shaft R. The outside of the sleeve Q carries a spring brake F, one end of the coil of said brake being seated against a step 83 formed on a collar 84 fixed by suitable means to the end of the sleeve Q. The other end of the brake F is secured by an extension 85 of the last coil to a pulley-like member 86, which is rotatable and slidably mounted on the sleeve Q. The periphery of the member 86 is grooved to receive a brake member 87. Said member is carried by a vertical pin 88 slidably mounted in a bracket 89 extending from a portion of the casing 16. A spring 90 urges the brake member 87 radially inwardly into engagement with the member 86. A cammed extension 91 on the member 87 is engageable with a cam face 92 formed on the sleeve 71 whereby movement of said sleeve in one direction lifts the member 87 out of engagement, and whereby upon movement of the sleeve in the other direction the spring 90 seats the brake member 87 on the member 86 thereby actuating the spring brake F and causing its engagement.

The brake F is adapted to engage a finished brake face T formed on a cylindrical portion 93 of the casing 16.

The shaft R is provided with a collar 94 to provide abutment means for spring clutches mounted at the sides thereof. A coil spring clutch D has its end coil seated on a step 95 formed on the collar 94. The other end of said spring clutch is provided with a coiled wire extension 96 to provide an automatic agitator for engaging the clutch in one direction of rotation relative to the sleeve P, said clutch engaging the inner face of said sleeve.

A spring clutch E mounted on the shaft R has the end of its last coil abutting a step 97 formed on the collar 94. The other end of said clutch is provided with a coil spring extension 98 which provides an automatic agitator for the clutch in one direction of rotation relative to the sleeve Q, said clutch E being adapted to engage the inner cylindrical face of the sleeve Q.

It will be noted that a bushing 99 is provided between the drum structure 63 and a reduced end portion of the sleeve P. Said braking, together with the ball-bearing assembly 82, centers the drum structure 63 with respect to the input shaft 33, the output shaft R, and the planet carrier 39.

In any power-transmitting device involving the use of gearing in order to change ratio, it is necessary to have a reaction point in the gear train. In the device of this invention as above described, there are two reaction points on the transmission casing, one being the reaction obtained by engagement of the coil spring brake B with the sleeve O, which is attached to the casing, and the other being engagement of the spring brake F with the face T, which is carried by the casing. In addition to these two reaction points, the input and output shafts may be locked together, as will be hereinafter described, whereby there is a direct drive, reaction in this case being taken against the chassis frame by the engine block and other associated parts.

In the description of the operation of applicant's transmission, the direction of rotation of the various elements will be referred to as viewed from the output end of the transmission; that is, from the right end of the drawings. The transmission input shaft 33 will then be driven in a counter-clockwise direction.

Reference will first be made to Figure 4 of the diagrammatic drawings. Neutral position and direct drive will be first described, using Figure 4 as the basis for the explanation.

Direction drive will first be explained. With the power input shaft 33 rotating in a counter-clockwise direction and with the balls 69 thrown out by centrifugal force whereby the spring clutch C is actuated, the sleeve P will be secured to the sleeve S for rotation therewith. The gear train G, H, and I will therefore be held locked against movement and the entire structure will rotate as a unit in a counter-clockwise direction. The spring clutch D will automatically be engaged and drive will be transmitted therethrough to the output shaft R at the speed of the input shaft 33. The brake B is shown in dotted lines in order to simplify the showing, said dotted lines indicating the position of the clutch or brake and symbolizing an inactive clutch or brake through which no power is being transmitted and which is not engaged with the sleeve O. The same type of showing is used for the clutch E for the same purpose; also for the brake F.

Referring to Figure 3, low-speed operation will now be described. With the input shaft 33 rotating in a counter-clockwise direction, the gear G is driven in the same direction and the gear H is rotated about its axis in the reverse, or clockwise, direction. This direction of rotation of the gear H would act to drive the internal gear I in the reverse, or counter-clockwise, direction. Said internal gear, however, is locked against counter-clockwise direction by the spring brake F. The gear H and its carrier acting against this stationary reaction operates in a counter-clockwise direction. Power is then transmitted through the sleeve P at a reduced speed ratio to the output shaft R by means of the self-energizing spring clutch D. This gives the low-speed operation, reaction being taken on the transmission casing 16 by engagement of the spring brake F with the face T formed on a portion of the casing.

When operation in low speed reaches the point when the centrifugal force of the balls 69, which act as a governor, is high enough to produce a predetermined amount of drag on the exciting ring 68 of the spring clutch D, the sleeves P and S, as above pointed out, are locked together. The entire internal structure within the casing 16 is then driven in a counter-clockwise direction.

Referring to Figure 5, when the selecting mechanism is moved to engage the brake shoe 53 and disengage the brake shoe 87, reverse speed is obtained. As indicated in Figure 5, with the power input shaft 33 rotating in a counter-clockwise direction, the gear G rotates the gear H in a clockwise direction. The planet carrier, including the sleeve N, is held against movement by engagement of the spring brake B with the sleeve O on the casing. The gear H then drives the internal gear I in a clockwise direction. The sleeve Q energizes the clutch E engaging the output shaft R, thereby driving said shaft in a clockwise direction whereby reverse speed is attained.

Figure 6 illustrates a neutral position in which rotation of the power input shaft 33 merely spins the gearing without applying any power to the output shaft R except that due to frictional drag of the oil in the transmission. With the brake shoes 53 and 87 both disengaged, and with the balls 69 having no appreciable centrifugal force, there will be no drive engagement of the sleeves P and Q with the clutches D and E by the output shaft R.

Although it is intended that the shift from low to high speed be automatic, under certain conditions it is desirable to remain in low gear. For that purpose, a lock-out means is provided. The annular actuating element 74 may be moved by means of the linkage illustrated to engage the balls 69 and hold them against outward movement by centrifugal force in the bores 70. By this means the transmission may be held in low gear until such time as it is desired to permit automatic shifting into high gear.

In order to prevent undesirable free wheeling or coasting, a clutch A is provided between the power input shaft 53 and the planet carrier. When power from the output shaft R comes from the output end of the transmission through the clutch E to the planet carrier and therefrom to the sleeve N, the clutch A engages with the power input shaft 33 whereby the engine brakes the overrunning action.

If a vehicle in which this transmission is installed is parked on an upgrade with a dead engine, and if the selector mechanism is set for forward drive, no-back lock can be effected since shaft R would tend to turn sleeve P by means of clutch D in a clockwise direction. S would then be locked by means of brake F requiring the planets to turn the engine which is dead. This would act as a brake and give the desired braking action. When parked on a down grade, the same results may be obtained by moving the selector mechanism to a reverse position.

It is to be understood that only a preferred embodiment has been illustrated showing applicant's use of spring clutches in connection with a planetary transmission. It is to be understood that said transmission may take varied forms and modifications, and that applicant limits his claim to invention only by the scope of the appended claims.

What is claimed is:

1. A transmission including a housing structure, a power input shaft rotatably carried by the housing structure, a gear fixed to said shaft, a planet carrier rotatably mounted concentric with respect to said shaft, a gear rotatably mounted on the planet carrier in mesh with the gear on the shaft, a rotatable drum structure having an internal gear in mesh wtih said planet gear, an output shaft rotatably carried by the housing structure concentric with respect to the power input shaft, a one-way clutch carried by the power input shaft and engageable with the planet carrier, a brake carried by the planet carrier and engageable with the housing structure, a one-way clutch carried by the output shaft and engageable with the planet carrier, a one-way clutch carried by the output shaft and engageable with the drum structure, a one-way brake carried by the drum structure and engageable with the housing structure, manual means for engaging and disengaging the brakes between the housing structure and the planet carrier and the drum structure, said clutches between the input shaft and the planet carrier, between the output shaft and the planet carrier and between the output shaft and the drum structure being automatically engageable in one relative direction of rotation and freely overrunning in the other relative direction of rotation, a one-way clutch carried by the planet carrier and engageable with the drum structure, and automatic means to engage said clutch when a predetermined speed of the planet carrier is attained whereby direct drive is obtained, manual means being provided for rendering said automatic means inoperative.

2. A transmission including a power input shaft, a gear fixed to said shaft, a planet carrier rotatably mounted concentric with respect to said shaft, a gear rotatably mounted on the planet carrier in mesh with the gear on the shaft, a rotatable drum structure having an internal gear in mesh with said planet gear, an output shaft mounted concentric with respect to the power input shaft, a housing structure which carries all of said mentioned elements, a coil spring brake positioned between the planet carrier and the housing structure, a coil spring clutch between the output shaft and the planet carrier, a coil spring clutch between the output shaft and the drum structure, a coiled spring brake positioned between said drum structure and the housing structure, means for engaging and disengaging the spring brakes between the housing structure and the planet carrier and the drum structure, a spring clutch between the planet carrier and the drum structure, means to engage said clutch when a predetermined speed of the planet carrier is attained whereby direct drive is obtained.

3. A transmission including a power input shaft, a gear carried by said shaft, a planet carrier rotatably mounted concentric with respect to said shaft, a gear rotatably mounted on the planet carrier in mesh with the gear on the shaft, a rotatable drum structure having an internal gear in mesh with said planet gear, an output shaft mounted concentric with respect to the power input shaft, a housing structure which carries all of said mentioned elements, a one-way engaging brake positioned between the planet carrier and the housing structure, a one-way engaging clutch between the output shaft and the planet carrier, a one-way engaging clutch between the output shaft and the drum structure with the internal gear and a one-way engaging brake positioned between said drum structure and the housing structure, manual means for engaging and disengaging the brakes between the housing structure and the planet carrier and the drum structure, said clutches between the input shaft and the planet carrier, between the output shaft and the planet carrier and between the output shaft and the drum structure being automatically engageable in one relative direction of rotation and freely overrunning in the other relative direction of rotation, a one-way engaging clutch between the planet carrier and the drum structure, and automatic means to engage said clutch when a predetermined speed is attained on the planet carrier whereby direct drive is obtained, manual means being provided for rendering said automatic means inoperative.

4. A transmission including a power input shaft, a gear carried by said shaft, a planet carrier rotatably mounted concentric with respect to said shaft, a gear rotatably mounted on the planet carrier in mesh with the gear on the shaft, a rotatable drum structure having an internal gear in mesh with said planet gear, an output shaft mounted concentric with respect to the power input shaft, a housing structure which carries all of said mentioned elements, a coil spring clutch positioned between the power input shaft and the planet carrier, a one-way engaging brake positioned between the planet carrier and the housing structure, a one-way engaging clutch between the output shaft and the planet carrier, a one-way engaging clutch between the output shaft and the drum structure with the internal gear and a one-way brake positioned between said drum structure and the housing structure, manual means for engaging and disengaging the brakes between the housing structure and the planet carrier and the drum structure, said clutches between the input shaft and the planet carrier, between the output shaft and the planet carrier and between the output shaft and the drum structure being automatically engageable in one relative direction of rotation and freely overrunning in the other relative direction of rotation, a one-way engaging clutch between the planet carrier and the drum structure, and automatic means to engage said clutch when a predetermined speed is attained on the planet carrier whereby direction drive is obtained, manual means being provided for rendering said automatic means inoperative.

5. A transmission including a power input shaft, a gear fixed to said shaft, a planet carrier rotatably mounted concentric with respect to said shaft, a gear rotatably mounted on the planet carrier in mesh with the gear on the shaft, a rotatable drum structure having an internal gear in mesh with said planet gear, an output shaft mounted concentric with respect to the power input shaft, a housing structure which carries all of said mentioned elements, a coil spring clutch positioned between the power input shaft and the planet carrier, a coil spring brake positioned between the planet carrier and the housing structure, a coil spring clutch between the output shaft and the planet carrier, a coil spring clutch between the output shaft and the drum structure, a coiled spring brake positioned between said drum structure and the housing structure, manual means for engaging and disengaging the spring brakes between the housing structure and the planet carrier and the drum structure, said spring clutches between the input shaft and the planet carrier, between the output shaft and the planet carrier and between the output shaft and the drum structure being automatically engageable in one relative direction of rotation and freely overrunning in the other relative direction of rotation, a spring clutch between the planet carrier and the drum structure, automatic means to engage said clutch when a predetermined speed of the planet carrier is attained whereby direct drive is obtained, manual means being provided for rendering said automatic means inoperative.

6. A transmission including a housing structure, a power input shaft rotatably carried by the casing, a gear fixed to said shaft, a planet carrier rotatably mounted on the planet carrier in mesh with the gear on the shaft, a rotatable drum structure having an internal gear in mesh with said planet gear, an output shaft rotatably carried by the casing concentric with respect to the power input shaft, a coil spring clutch carried by the power input shaft and engageable with the planet carrier, a coil spring brake carried by the planet carrier and engageable with the housing structure, a coil spring clutch carried by the output shaft and engageable with the planet carrier, a coil spring clutch carried by the output shaft and engageable with the drum structure, a coiled spring brake carried by the drum structure and engageable with the housing structure, manual means for engaging and disengaging the spring brakes between the housing structure and the planet carrier and the drum structure, said spring clutches between the input shaft and the planet carrier, between the output shaft and the planet carrier and between the output shaft and the drum structure being automatically engageable in one relative direction of rotation and freely overrunning in the other relative direction of rotation, a spring clutch carried by the planet carrier and engageable with the drum structure, and automatic means to engage said clutch when a predetermined speed at the planet carrier is attained whereby direct drive is obtained, manual means being provided for rendering said automatic means inoperative.

7. A power transmission device including a casing, a power input shaft journaled in said casing, a concentric power output shaft journaled in the casing, a planet carrier assembly journaled on said input and said output shafts, a drum structure journaled on said planet carrier and on said output shaft, said planet carrier including a sleeve overlying a portion of the input shaft, said casing being provided with a sleeve extending in overlying relation with respect to said sleeve on the planet carrier, a one-way brake interposed between said sleeves, said brake being manually disengageable, said planet carrier being provided with a second sleeve overlying a portion of the output shaft, a one-way clutch interposed between said sleeve and said output shaft, said clutch being automatically engageable during relative rotation of the sleeve and the shaft in one direction, said drum structure being provided with a sleeve overlying and spaced from said second sleeve on the planet carrier, a self-engaging spring clutch device interposed between said sleeves, means for rendering said clutch means inoperative, said casing being provided with a sleeve extending over the output shaft in spaced relation with respect thereto, said drum structure being provided with a second sleeve extending between said output shaft and said second sleeve on the casing and being radially spaced from each of said elements, a one-way brake interposed between the second sleeve of the drum structure and the second sleeve of the casing, manually operable means for disengaging said brake, a one-way clutch interposed between said second sleeve on the drum structure and the power output shaft, said clutch being provided with means for automatically engaging the clutch upon relative angular movement of the shaft and the sleeve in one direction.

8. A power transmission device including a casing, a power input shaft journaled in said casing, a concentric power output shaft journaled in the casing, a planet carrier assembly journaled on said input and said output shafts, a drum structure journaled on said planet carrier and on said output shaft, said planet carrier including a sleeve overlying a portion of the input shaft, a spring clutch interposed between said input shaft and said sleeve, said casing being provided with a sleeve extending in overlying relation with respect to said sleeve on the planet carrier, a one-way brake interposed between said sleeve on the planet carrier and said sleeve on the casing, said brake being manually disengageable, said planet carrier being provided with a second sleeve overlying a portion of the output shaft, a one-way clutch interposed between said sleeve and said output shaft, said clutch being automatically engageable during relative rotation of the sleeve and the shaft in one direction, said drum structure being provided with a sleeve overlying and spaced from said second sleeve on the planet carrier, a spring clutch device interposed between said sleeves, centrifugal operating means for actuating said spring clutch, means for rendering said centrifugal means inoperative, said casing being provided with a sleeve extending over the output shaft in spaced relation with respect thereto, said drum structure being provided with a second sleeve extending between said output shaft and said second sleeve on the casing and being radially spaced from each of said elements, a one-way brake interposed between the second sleeve of the drum structure and the second sleeve of the casing, manually operable for engaging said brake, a one-way clutch interposed between said second sleeve on the drum structure and the power output shaft, said clutch being provided with means for automatically engaging the clutch upon relative angular movement of the shaft and the sleeve in one direction, and manual control means including linkage connecting the manually operable clutches and the centrifugal operating means.

9. A power transmission device including a casing, a power input shaft journaled in said casing, a concentric power output shaft journaled in the casing, a planet carrier assembly journaled on said input and said output shafts, a drum structure journaled on said planet carrier and on said output shaft, said planet carrier including a sleeve overlying a portion of the input shaft, said casing being provided with a sleeve extending in overlying relation with respect to said sleeve on the planet carrier, a spring brake interposed between said sleeve, said brake being manually disengageable, said planet carrier being provided with a second sleeve overlying a portion of the output shaft, a spring clutch interposed between said sleeve and said output shaft, said clutch being automatically engageable during relative rotation of the sleeve and the shaft in one direction, said drum structure being provided with a sleeve overlying and spaced from said second sleeve on the planet carrier, a self-engaging spring clutch device interposed between said sleeves, means for rendering said clutch means inoperative, said casing being provided with a sleeve extending over the output shaft in spaced relation with respect thereto, said drum structure being provided with a second sleeve extending between said output shaft and said second sleeve on the casing and being radially spaced from each of said elements, a spring brake interposed between the second sleeve of the drum structure and the second sleeve of the casing, manually operable means for disengaging said brake, a clutch interposed between said second sleeve on the drum structure and the power output shaft, said clutch being provided with means for automatically engaging the clutch upon relative angular movement of the shaft and the sleeve in one direction.

10. A power transmission device including a casing, a power input shaft journaled in said casing, a concentric power output shaft journaled in the casing, a planet carrier assembly journaled on said input and said output shafts, a drum structure journaled on said planet carrier and on said output shaft, said planet carrier including a sleeve overlying a portion of the input shaft, a spring clutch interposed between said input shaft and said sleeve, said casing being provided with a sleeve extending in overlying relation with respect to said sleeve on the planet carrier, a spring brake interposed between said sleeves, said brake being manually engageable, said planet carrier being provided with a second sleeve overlying a portion of the output shaft, a spring clutch interposed between said sleeve and said output shaft, said clutch being automatically engageable during relative rotation of the sleeve and the shaft in one direction, said drum structure being provided with a sleeve overlying and spaced from said second sleeve on the planet carrier, a spring clutch device interposed between said sleeves, centrifugal means for engaging said clutch and manual means for rendering said centrifugal means inoperative, said casing being provided with a sleeve extending over the output shaft in spaced relation with respect thereto, said drum structure being provided with a second sleeve extending between said output shaft and said second sleeve on the casing and being radially spaced from each of said elements, a spring brake interposed between the second sleeve of the drum structure and the second sleeve of the casing, manually operable means for engaging said brake, a spring clutch interposed between said second sleeve on the drum structure and the power output shaft, said clutch being provided with means for automatically engaging the clutch upon relative angular movement of the shaft and the sleeve in one direction, and manual control means including linkage connecting the manually operable clutches and the centrifugal operating means.

FRANK W. AVILA.